United States Patent
Dreher et al.

(10) Patent No.: US 8,272,288 B2
(45) Date of Patent: Sep. 25, 2012

(54) DOUBLE-CLUTCH TRANSMISSION WITH A DEVICE FOR CONTROLLING A PLURALITY OF HYDRAULIC SHIFT CYLINDERS

(75) Inventors: Felix Dreher, Staufen im Breisgau (DE); Dietmar Lang, Höheischweiler (DE); Martin Staudinger, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1098 days.

(21) Appl. No.: 12/220,318

(22) Filed: Jul. 23, 2008

(65) Prior Publication Data
US 2009/0065322 A1  Mar. 12, 2009

(30) Foreign Application Priority Data
Jul. 23, 2007  (DE) .......................... 10 2007 034 200

(51) Int. Cl.
*B60K 3/00* (2006.01)

(52) U.S. Cl. ....................................... 74/335; 74/473.11
(58) Field of Classification Search .................... 74/335, 74/473.11
See application file for complete search history.

(56) References Cited

U.S. PATENT DOCUMENTS

| | | | | |
|---|---|---|---|---|
| 3,834,499 | A * | 9/1974 | Candellero et al. | 477/73 |
| 2006/0054442 | A1* | 3/2006 | Hegerath et al. | 192/48.9 |
| 2006/0150762 | A1* | 7/2006 | Petrzik | 74/346 |
| 2008/0104953 | A1* | 5/2008 | Vigholm | 60/413 |

FOREIGN PATENT DOCUMENTS

DE   10 2005 019 516 A1   12/2005

* cited by examiner

*Primary Examiner* — Ha D. Ho
(74) *Attorney, Agent, or Firm* — Alfred J. Mangels

(57) ABSTRACT

A double-clutch transmission having at least three and preferably four, hydraulic shift cylinders, and a control device to actuate the hydraulic shift cylinders. To improve the speed of operation when selecting a gear, the shift cylinders needed for gear shifting are actuated with the aid of at least three electromagnetically shiftable directional valves.

8 Claims, 3 Drawing Sheets

DOUBLE-CLUTCH TRANSMISSION WITH A DEVICE FOR CONTROLLING A PLURALITY OF HYDRAULIC SHIFT CYLINDERS

BACKGROUND OF THE INVENTION

1. Field of the Invention

The present invention relates to a double-clutch transmission having hydraulic shift cylinders and a control device for controlling the operation of the shift cylinders.

2. Description of the Related Art

A device for controlling hydraulic shift cylinders is disclosed in published German Patent Application No. DE 10 2005 019 516 A1. The device includes a first slide valve with a control inlet that is pressurizable with a control pressure, and a system pressure inlet that is pressurizable with system pressure, as well as two outlets and at least one return outlet. Depending upon the pressure present at the control inlet optionally one of the two outlets is connected to the system pressure, possibly through a pressure regulating mechanism, and at the same time the other outlet is connected to the return outlet. A valve device by means of which the shift cylinders are selectively actuatable is connected to the outlets of the slide valve.

In addition, a hydraulic control for actuating a double-clutch transmission is known, wherein a plurality of shift cylinders are actuated hydraulically to shift gears. The shift cylinders can be pressurized by means of a selector valve system by connecting the hydraulic cylinders for actuating the two clutches and the shift valve system to the pressure side of a pressure apparatus. To initiate a shift process, a rotary valve selects the shift rail that is to be moved. The selector valve system, which includes a two-stage pressure-regulating valve, is actuated by means of a proportional electromagnet. In a middle region of the controlling magnetic flux, the selector valve system opens its two outlet ports, which are connected to the tank, so that those ports become depressurized. For high control currents, the selector valve system regulates the pressure in the first outlet port, while the second outlet port remains connected to the tank. For low control currents, on the other hand, the selector valve system regulates the pressure in the second outlet port, while the first outlet port remains connected to the tank. By means of a rotary slide valve, the two pushers are guided on both sides of the double-acting cylinder of the correspondingly selected shift rail. At the same time, the shift cylinders for the inactive shift rails are pressurized on both sides with the same pressure, so that they do not move.

To adjust a desired shift rail position, the selector valve system must be regulated back and forth quickly by means of the magnetic flux, between the low pressure region at the first outlet port and the low pressure region at the second outlet port. That means that for the movement of the valve piston in the selector valve system, the piston must move back and forth very rapidly between the two control edges of the outlet ports. To prevent leakage and consequent loss of system pressure, the two positions must be located relatively far apart from each other, so that the overlap at the two control edges is as large as possible, because the valve piston must be between those two control edges as long as no gear is selected, so that there is no pressure in the two outlet ports.

However, that long travel of the valve piston between the two control edges means that the controllability of the selector valve system is limited, particularly at low temperatures, at which high viscous friction occurs in the valve due to the viscosity of the hydraulic fluid. Likewise, that long distance from the respective rest positions until one of the control edges is reached also results in delays in purely force-controlled or pressure-controlled engagement of a gear.

An object of the present invention is therefore to provide a device for controlling a plurality of hydraulic shift cylinders, in which the viscosity of the hydraulic fluid has no influence on the controllability of the actuation of the shift cylinders even at low temperatures, and with which the speed of engaging a gear is improved.

SUMMARY OF THE INVENTION

Briefly stated, in accordance with one aspect of the present invention, a double-clutch transmission for providing a plurality of output speeds includes at least three shift cylinders for actuating shift rails associated with respective gear stages of the transmission; and a control device for selectively actuating respective shift cylinders, wherein the control device includes at least three electromagnetically switchable directional valves for actuating respective ones of the shift cylinders.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
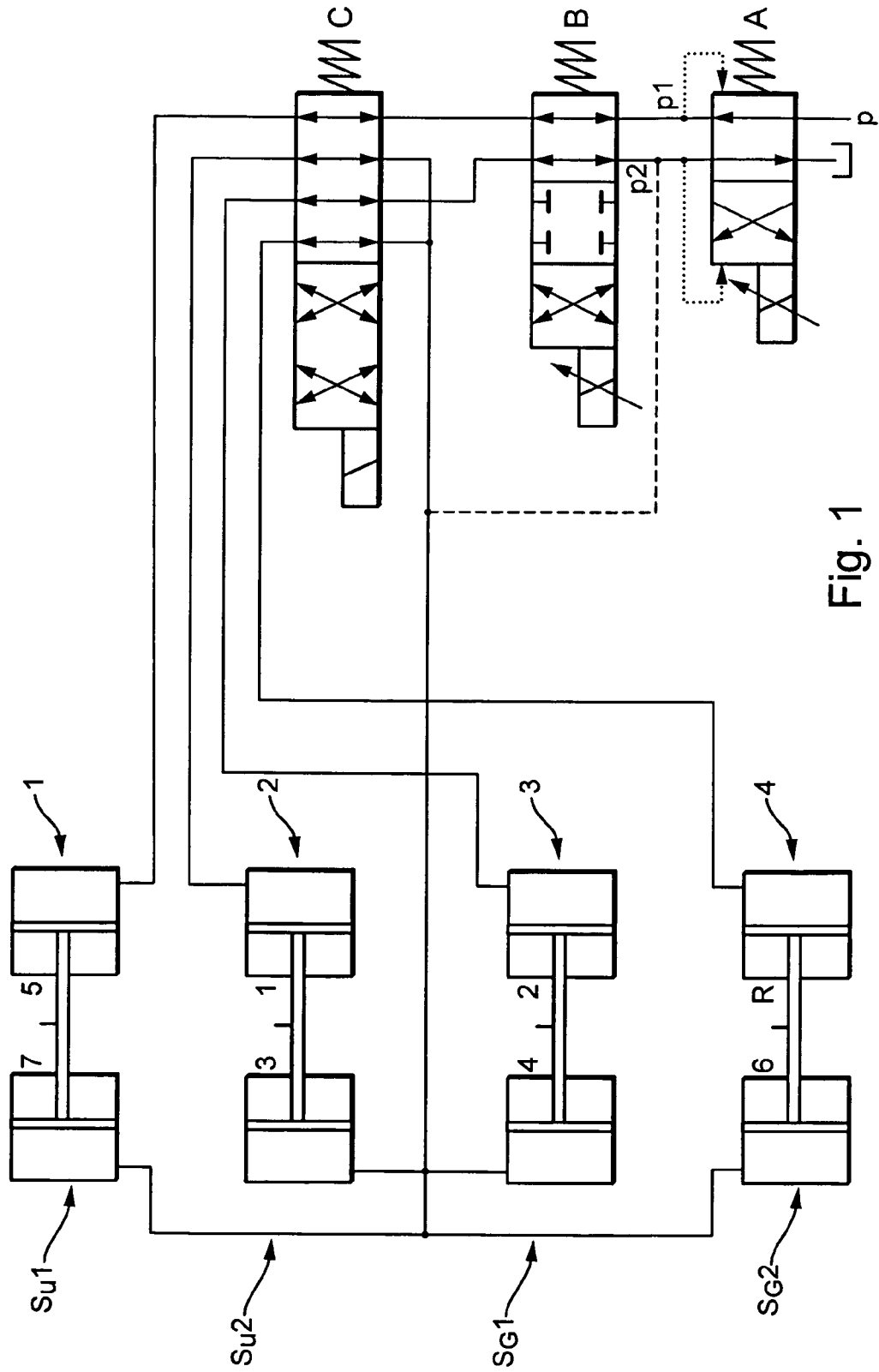
FIG. 1 is a hydraulic circuit diagram in accordance with an embodiment of the present invention.

FIG. 1 shows a hydraulic circuit diagram for actuating four shift cylinders 1, 2, 3, and 4 of a double-clutch transmission. As is known, a double-clutch transmission is made up of two divided transmissions, each of which is controlled hydraulically by a respective associated actuation arrangement. The actuation arrangement is composed essentially of a corresponding number of shift rails for selecting gears. In that example two shift rails $S_U1$, $S_U2$ are needed for divided transmission with the odd-numbered gears and two shift rails $S_G1$, $S_G2$ for the even-numbered gears. Each of the four shift rails $S_U1$, $S_U2$, $S_G1$, $S_G2$ is controlled by a hydraulic or shift cylinder 1, 2, 3, or 4, which has two end positions, as is known, so that it is possible with those four shift rails $S_U1$, $S_U2$, $S_G1$, $S_G2$ to select 8 gears, i.e., 7 forward gears and one reverse gear.

The individual gears are selected by shift cylinders 1, 2, 3, and 4. In that exemplary embodiment, shift cylinder 1 shifts gears seven and five, shift cylinder 2 shifts gears three and one, shift cylinder 3 shifts gears two and four, and shift cylinder 4 shifts gear six and reverse. As mentioned earlier, shift cylinders 1, 2, 3, and 4 are actuated hydraulically and have two end positions, which are always associated with one of the two corresponding gears 1 through 8, as well as a middle position in which neither of the two associated gears is selected.

It can be seen from FIG. 1 that the odd-numbered gears 7, 5, 3, and 1 operate together with a first transmission input shaft (not shown) and with a first hydraulically operated clutch (not shown). Correspondingly, the even-numbered gears 2, 4, and 6 and the reverse gear operate together with a second transmission input shaft (not shown) and with a second hydraulically operated clutch (not shown).

By means of a pump, not shown in FIG. 1, a system pressure p is produced in a conduit and in a line routed through a pilot valve. It can be seen from the hydraulic circuit diagram in FIG. 1 that a pressure regulator is formed by a directional valve A, with any number of intermediate positions, between the system pressure p and the unpressurized state by the connection to a tank. The system pressure p is present at an input to the directional valve A, and the other input is connected to the tank.

With the help of directional valve A, either of the two inputs can be pressurized alternately, while the respective other input is unpressurized. In addition, directional valve A has two outputs and a middle position M in which there is no pressure at any of the outputs. In that relatively narrow middle position M the control edges are designed for a minimal overlap, so that in the middle position M all four control edges, system pressure p—p1, p1—tank, system pressure p—p2 as well as p2—tank are active without appreciable additional travel. That results in good controllability and only short delays when engaging a gear.

However, because directional valve A has significant leakage in that middle position M, and the pressure difference between the two outputs equals zero, it can only be regulated with difficulty. For that reason, two-way valves B and C are connected at the outlet side. In that case, directional valve B assumes the function of the inactive shift of the corresponding gear actuator, and therewith the function of the gear positioner, because directional valve B has three positions that are controlled by means of a proportional electromagnet.

Without current, the divided transmission with the odd-numbered gears is selected; with full current the divided transmission with the even-numbered gears is selected. The arrangement can also equally well be the opposite. But with medium current, both the two feed lines to gear actuator B and the two inputs are blocked. The directional valve C, controlled by means of a shift electromagnet, in turn selects within the divided transmission selected by directional valve B the corresponding active shift rail $S_U1, S_U2, S_G1, S_G2$. That control functions as follows.

In order to move a particular shift rail $S_U1, S_U2, S_G1, S_G2$, directional valve C is first set to the appropriate position, then directional valve A is set to the middle position, or to engage a gear it is set immediately to the desired pressure level. Next, the corresponding divided transmission is unlocked with directional valve B, which remains in its middle position as long as no shift motion is necessary. If the gear engaging or disengaging process, in which the pressure and possibly the travel distance are regulated by means of directional valve A, has ended, i.e., if the intended position of the shift rail $S_U1, S_U2, S_G1, S_G2$ has thus been reached, directional valve B is first set to its middle position. Now the active shift rail $S_U1, S_U2, S_G1, S_G2$ can not momentarily move. Next the current to directional valves A and C is switched off, on the one hand to save power and on the other hand to minimize the leakage at directional valve A, since the latter has the greatest overlap with the tank in the rest position or with full current. Directional valve B must be designed so that the overlaps with the tank and the adjacent positions are as large as possible in its middle position M.

In FIG. 1 the pressure p1 coming from directional valve A pressurizes shift cylinder 1, so that fifth gear is selected. In all of the other shift cylinders 2, 3, and 4 the same pressure level p2 exists at both inputs or outputs, so that shift cylinders 2, 3, and 4 remain in their middle position M.

Figure 2:
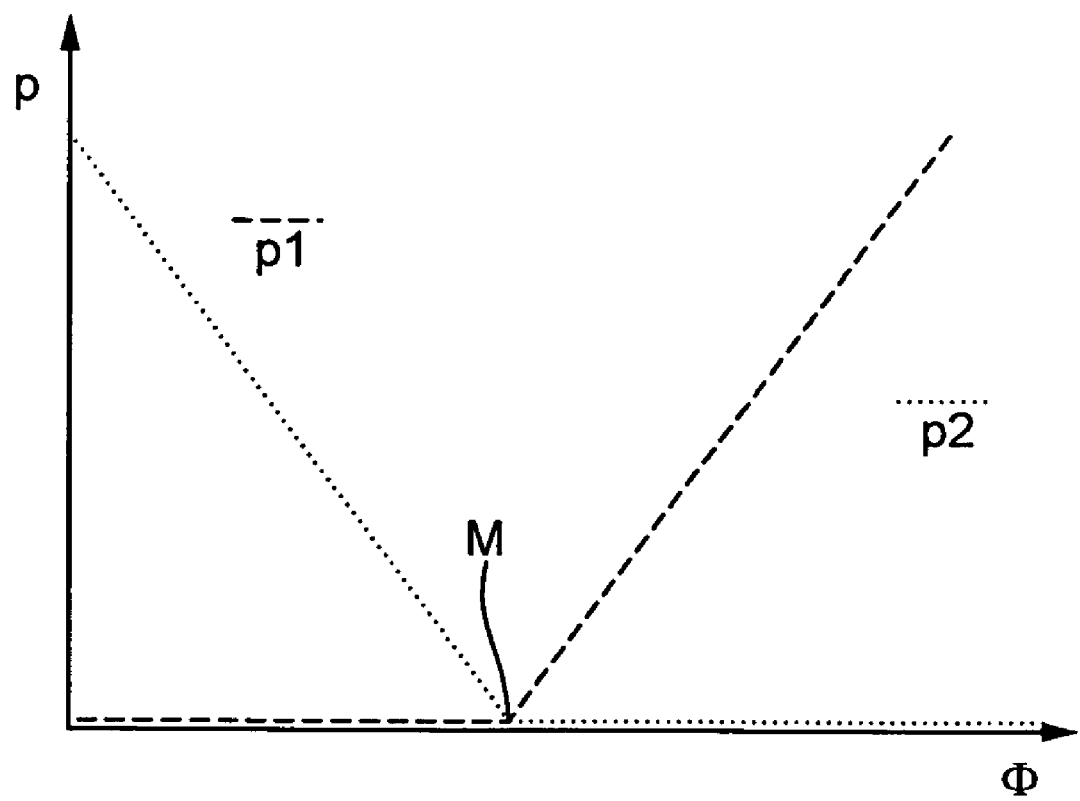
FIG. 2 is a graph showing the pressure distribution at the control edges of directional valve A of FIG. 1 as a function of the magnetic flux present at the valve or on the valve position.

FIG. 2 illustrates the control of the closing body to form the control edges within directional valve A, and thus system pressure p by means of a magnetic flux φ, so that it is divided into two different high pressures p1 and p2. In the middle position M of directional valve A, in which the overlap of the control edges is minimal and the two pressures p1 and p2 are briefly superimposed, all four control edges are active.

Figure 3:
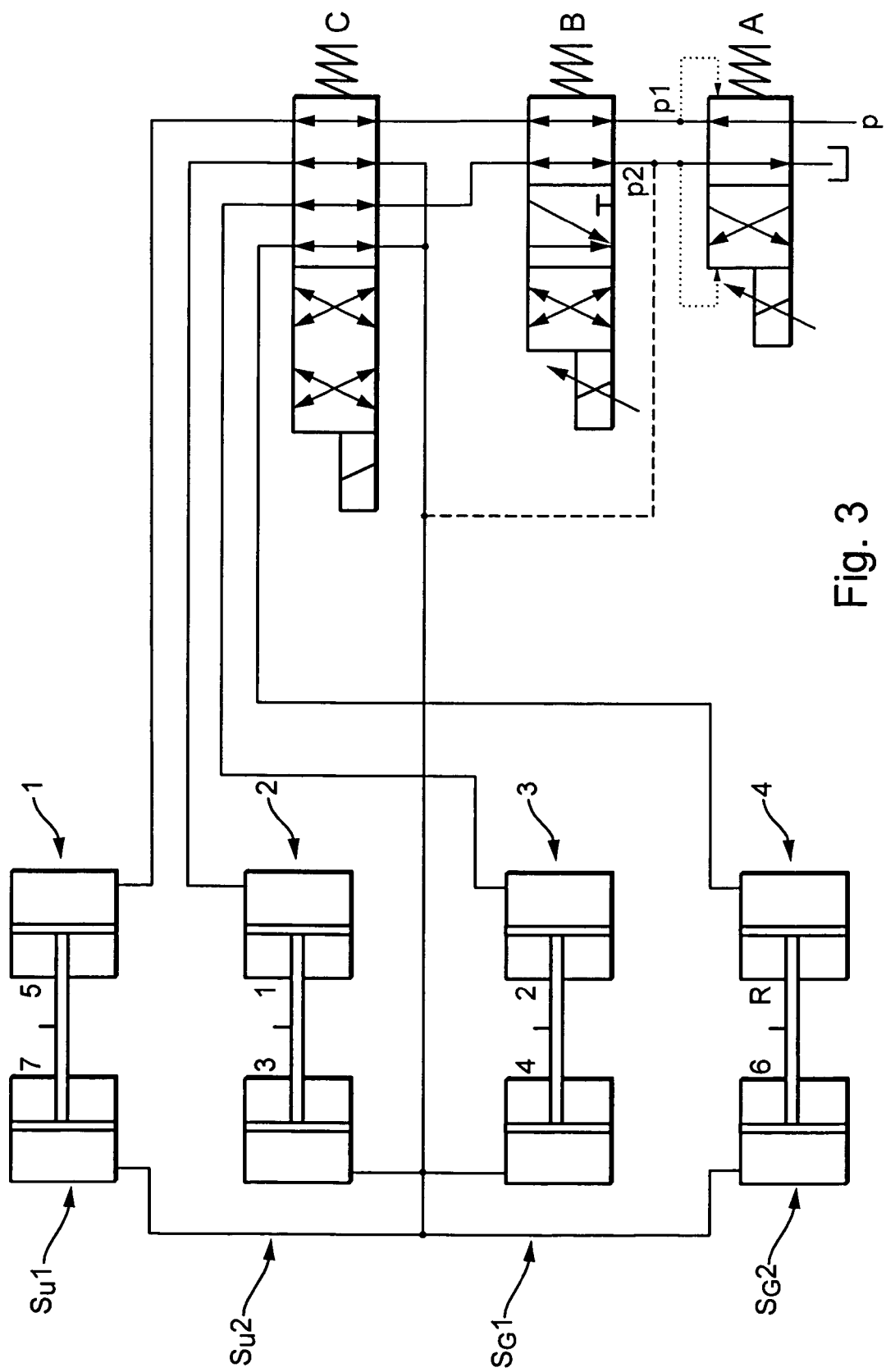
FIG. 3 is the hydraulic circuit diagram of FIG. 1 with modified shift allocations of directional valve B.

FIG. 3 shows another possibility for shift occupancy of directional valve B, in which both pressures p1 and p2 are connected to the tank and thus there is no flow in the system.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A double-clutch transmission for providing a plurality of output speeds, said transmission comprising: at least three shift cylinders for actuating shift rails associated with respective gear stages of the transmission; and a control device for selectively actuating respective shift cylinders, wherein the control device includes at least three electromagnetically switchable directional valves for actuating respective ones of the shift cylinders; and wherein a first directional valve functions as a pressure regulator.

2. A double-clutch transmission in accordance with claim 1, wherein a system hydraulic pressure is provided at a first inlet of a first directional valve, and a second inlet of the first directional valve is connected to a tank, whereby a high pressure is present at the first inlet and a low pressure is present at the second inlet and the low and high pressures are connected to respective inlets of a second directional valve, and wherein the low pressure is also communicated to at least one inlet to each inlet of the shift cylinders.

3. A double-clutch transmission in accordance with claim 2, wherein the high and low pressures are communicated to a third directional valve having four inlets, wherein one inlet of the third directional valve is in communication with an outlet of the first directional valve and in communication with an operating surface of each of the shift cylinders, and the other three inlets of the third directional valve are connected with an outlet of the second directional valve.

4. A double-clutch transmission in accordance with claim 1, wherein the first directional valve has a middle position in which four control edges of a valve slide member achieve a minimal overlap with outlet ports of the first directional valve.

5. A double-clutch transmission in accordance with claim 4, wherein in the middle position of the first directional valve a hydraulic pressure is operative at each of the control edges.

6. A double-clutch transmission in accordance with claim 1, wherein one of the shift cylinders at a time is subjected to a high pressure, and the other shift cylinders are each subjected to the same low pressure.

7. A double-clutch transmission in accordance with claim 1, wherein the three directional valves are connected in series.

8. A control system for controlling a double-clutch transmission, said control system comprising: a plurality of hydraulically-operated shift cylinders for actuating shift rails associated with respective gear stages of the transmission, and a control device for selectively actuating respective shift cylinders, wherein the control device includes at least three electromagnetically switchable directional valves for actuating respective ones of the shift cylinders; and wherein a first directional valve functions as a pressure regulator.

* * * * *